United States Patent
Jarrier

(10) Patent No.: US 8,349,045 B2
(45) Date of Patent: Jan. 8, 2013

(54) TURBINE INLET AIR FILTER SYSTEM

(75) Inventor: Etienne Rene Jarrier, Alton Hampshire (GB)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 13/025,227

(22) Filed: Feb. 11, 2011

(65) Prior Publication Data

US 2012/0204525 A1    Aug. 16, 2012

(51) Int. Cl.
*B01D 46/00* (2006.01)
(52) U.S. Cl. ............. 55/385.1; 55/418; 55/419; 60/751; 454/275
(58) Field of Classification Search ................ 55/385.1, 55/DIG. 17; 95/9; 96/228, 413; 60/794; 62/196.1, 228.1, 401, 190; 415/118; 454/9, 454/199
See application file for complete search history.

(56) References Cited

U.S. PATENT DOCUMENTS

| | | | |
|---|---|---|---|
| 4,312,645 A * | 1/1982 | Mavros et al. | 96/400 |
| 7,291,196 B1 | 11/2007 | Lerner | |
| 7,487,620 B2 * | 2/2009 | West | 52/200 |
| 2003/0177755 A1 | 9/2003 | Shingu et al. | |
| 2007/0294984 A1 | 12/2007 | Chillar et al. | |
| 2008/0098891 A1 | 5/2008 | Feher et al. | |
| 2008/0298957 A1 | 12/2008 | Chillar et al. | |
| 2010/0037777 A1 | 2/2010 | Davis et al. | |
| 2010/0050873 A1 | 3/2010 | Hiner et al. | |
| 2010/0054919 A1 | 3/2010 | Hinier et al. | |
| 2010/0171314 A1 | 7/2010 | Tackett | |
| 2010/0251678 A1 | 10/2010 | Mann et al. | |
| 2010/0307164 A1 | 12/2010 | Zhang et al. | |
| 2011/0154991 A1 | 6/2011 | Steele et al. | |
| 2012/0132075 A1 * | 5/2012 | Jarrier et al. | 95/268 |

FOREIGN PATENT DOCUMENTS

| | | |
|---|---|---|
| EP | 1923118 A1 | 5/2008 |
| GB | 2 445 077 A | 6/2008 |
| GB | 247467 A | 4/2011 |

OTHER PUBLICATIONS

Search Report issued in connection with GB Application No. 1202292.7, Jun. 8, 2012.

* cited by examiner

*Primary Examiner* — Duane Smith
*Assistant Examiner* — Minh-Chau Pham
(74) *Attorney, Agent, or Firm* — Sutherland Asbill & Brennan LLP

(57) ABSTRACT

The present application provides a turbine inlet air filter system for an incoming flow of air. The turbine inlet air filter system may include a gas turbine engine, a chimney, a weather hood positioned on the chimney, and a filter house. The incoming flow of air flows through the weather hood, the chimney, the filter house, and into the gas turbine engine.

10 Claims, 2 Drawing Sheets

TURBINE INLET AIR FILTER SYSTEM

TECHNICAL FIELD

The present application relates generally to gas turbine engines and more particularly relates to an enclosed weather hood positioned on an elevated chimney for use with a gas turbine engine.

BACKGROUND OF THE INVENTION

Power generation equipment, such as a gas turbine engine, uses a large supply of intake air to support the combustion process. Inlet air filtration systems thus may be used upstream of the compressor. Impure air laden with dust particles, salt, and other contaminants may damage the compressor blades and other types of power plant equipment via corrosion, erosion, and the like. Such damage may reduce the life expectancy and performance of the equipment. To avoid this problem, the inlet air generally passes through a series of filters to remove the contaminants. Known air filters, however, may be clogged by environmental conditions such as fog, rain, snow, and the like. Such clogging may reduce filtration and cooling efficiency while increasing the overall pressure drop. Inlet air pressure loss also can result in the loss of power output for the gas turbine engine as a whole.

There is a desire therefore for an improved gas turbine inlet air filter system. Such an improved inlet air filter system preferably would provide adequate filtering in any type of weather environment. Moreover, such an improved gas turbine inlet air filter system may have a minimum pressure loss therein. Specifically, such an inlet air filter system may increase the output of the gas turbine engine as a whole with increased overall efficiency.

SUMMARY OF THE INVENTION

The present application thus provides a turbine inlet air filter system for an incoming flow of air. The turbine inlet air filter system may include a gas turbine engine, a chimney, a weather hood positioned on the chimney, and a filter house. The incoming flow of air flows through the weather hood, the chimney, the filter house, and into the gas turbine engine.

The present application further provides a turbine inlet air filter system for an incoming flow of air. The turbine inlet air filter system may include a gas turbine engine, a chimney, a rotatable weather hood positioned on the chimney, and a filter house. The incoming flow of air flows through the rotatable weather hood, the chimney, the filter house, and into the gas turbine engine.

The present application further provides a turbine inlet air filter system for an incoming flow of air. The turbine inlet air filter system may include a gas turbine engine, a chimney, a multi-sided weather hood positioned on the chimney, and a filter house. The multi-sided weather hood may include a number of flaps on each side. The incoming flow of air flows through the multi-sided weather hood, the chimney, the filter house and into the gas turbine engine.

These and other features and improvements of the present application will become apparent to one of ordinary skill in the art upon review of the following detailed description when taken in conjunction with the several drawings and the appended claims.

DETAILED DESCRIPTION

Figure 1:
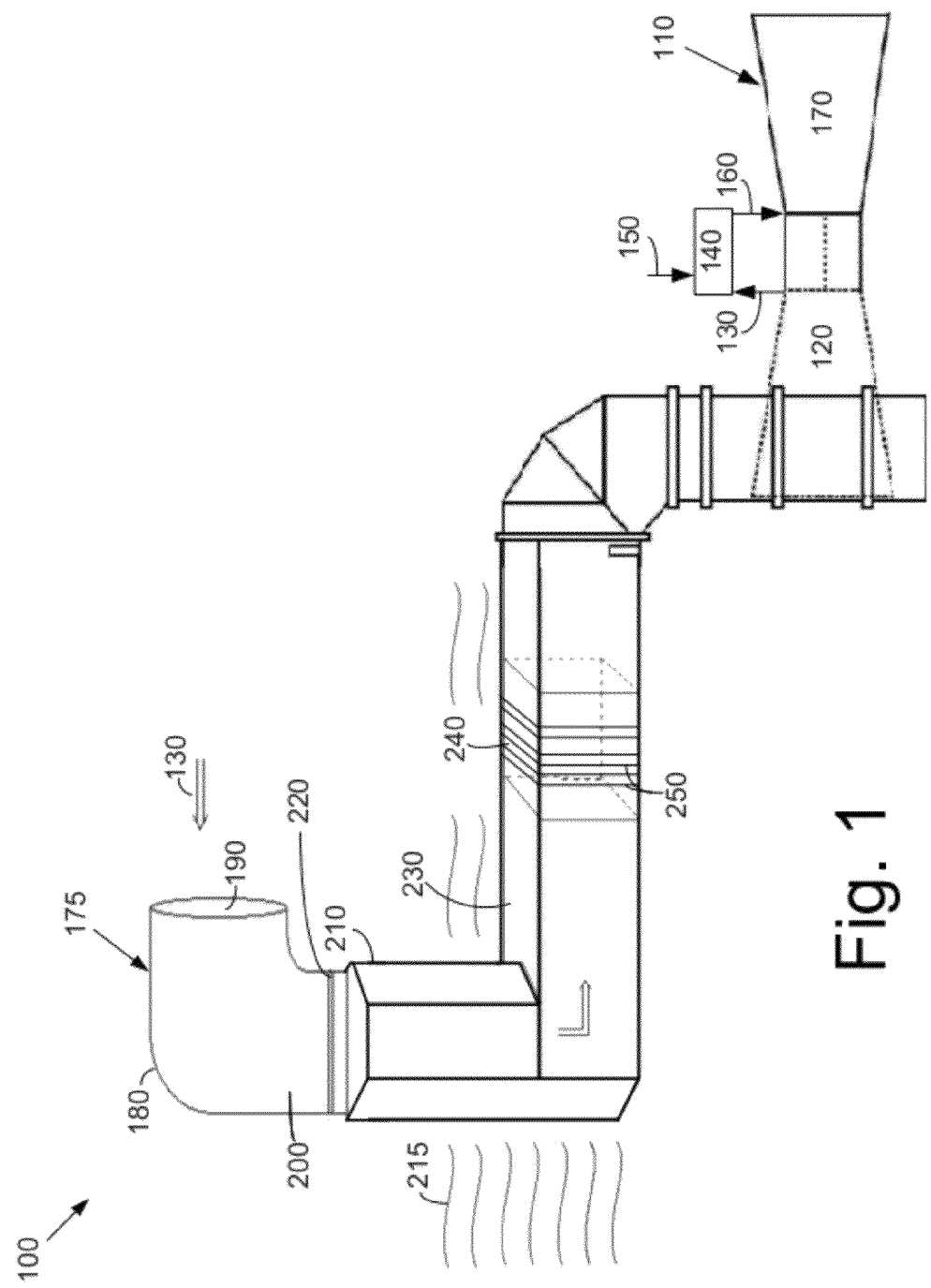
FIG. 1 is a schematic view of a turbine inlet air filter system as may be described herein.

Referring now to the drawings in which like numerals refer to like elements throughout the several views, FIG. 1 shows an example of a turbine inlet air filter system 100 as may be described herein. The turbine inlet air filter system 100 may be used with a gas turbine engine 110. As is known, the gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a compressed flow of fuel 150 and ignites the mixture to create a flow of combustion gasses 160. The flow of combustion gases 160 is in turn delivered to a turbine 170. The flow of combustion gases 160 drives the turbine 170 so as to produce mechanical work. The gas turbine engine 110 may use natural gas, various types of syngas, and/or other types of fuels. The gas turbine engine 110 may be any one of a number of different gas turbine engines offered by General Electric Company of Schenectady, N.Y. and the like. Other components and configurations may be used herein.

The turbine inlet air filter system 100 may include a weather hood 175. In this embodiment, the weather hood 175 may be a rotatable weather hood 180. Although the rotatable weather hood 180 may be shown largely in the shape of an elbow joint with a substantially vertical inlet 190 and a substantially horizontal outlet 200, the rotatable weather hood 180 may have any desired size, shape, or orientation. The rotatable weather hood 180 may be positioned on a chimney 210 or other type of elevated structure via a rotation device 220. The rotation device 220 may be any device that allows the rotatable weather hood 180 to rotate about the chimney 210. The rotation device 220 thus may be a series of ball bearings, rollers, and the like. The rotation device 220 also may be a powered device. The chimney 210 may have any desired height, but preferably higher than a typical local fog level 215 such as about twenty (20) meters or more. Other components and other configurations may be used herein.

The chimney 210 may be in communication with an inlet duct 230. The inlet duct 230 may have any desired size, shape, or orientation. A filter house 240 with any number of filters 250 therein may be positioned along the inlet duct 230. The filters 250 may be any type of filtering media. The filters 250 may be arranged in various stages with different capabilities. The inlet duct 230 may be in communication with the compressor 120 of the gas turbine engine 110. Other components and other configurations may be used herein.

In use, the use of the chimney 210 ensures that the rotatable weather hood 180 is above the typical local fog level 215. The chimney 210 prevents the fog to enter the rotatable weather hood 180. The avoidance of the fog and the like thus may enhance the operation of the filters 250 of the filter house 240. Specifically, the efficiency and lifetime of the filters 250 should be improved by preventing fog or other types of liquid mist from interacting with the filters 250.

The use of the rotation device 220 with the rotatable weather hood 180 thus allows the rotatable weather hood 180 always to be oriented to face the wind. Rotation of the weather hood 180 may be wind driven or the rotation device 220 may be powered such that the weather hood 180 may be positioned as desired. Improved capture of the wind thus should increase the initial pressure so as to improve overall gas turbine efficiency. The turbine inlet air filter system 100 thus provides both increased efficiency and improved component lifetime.

Figure 2:
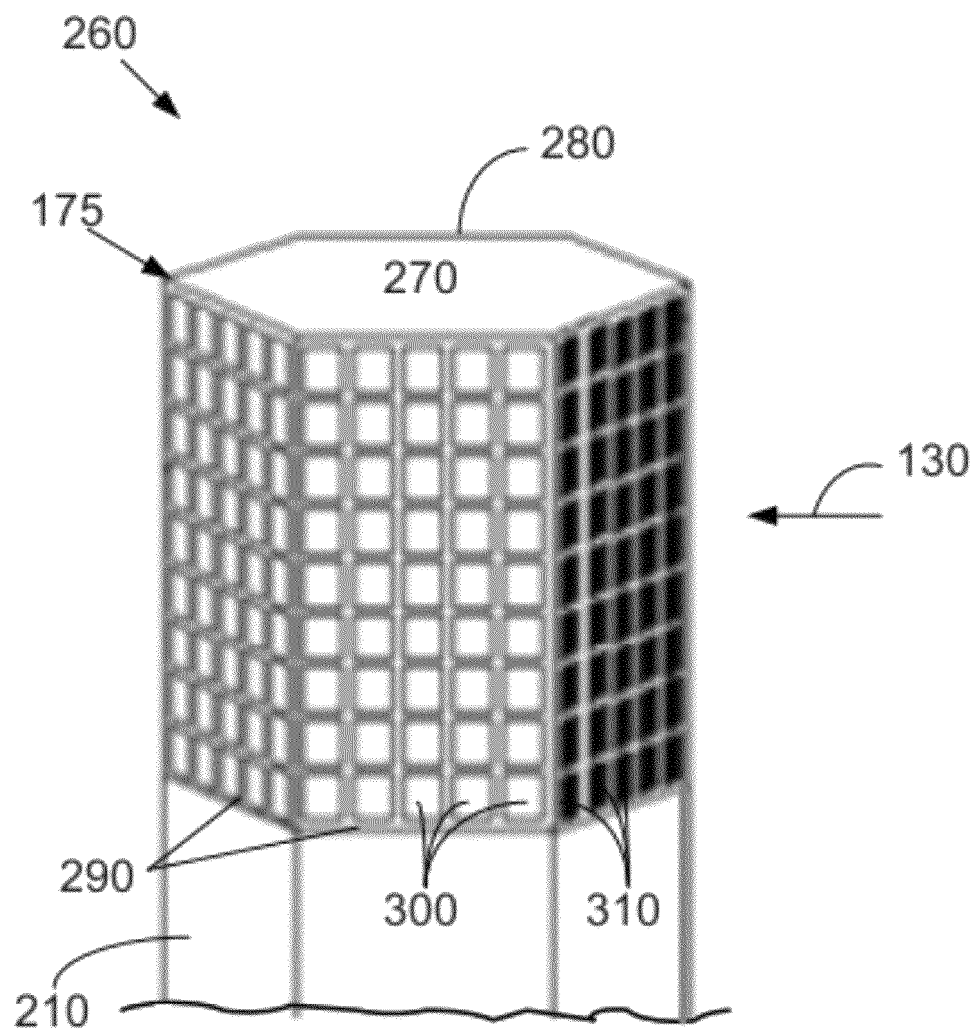
FIG. 2 is a schematic view of an alternative embodiment of a turbine inlet air filter system as may be described herein.

FIG. 2 shows an alternative embodiment of a turbine inlet air filter system 260 as may be described herein. The turbine inlet air filter system 260 may include a weather hood 175. In this embodiment, the weather hood 175 may be in the form of a multi-sided weather hood 270. The multi-sided weather hood 270 may be positioned on the chimney 210 and in communication with the other components described above. The multi-sided weather hood 270 may include a hexagonal shape 280. Moreover, the multi-sided weather hood 270 may be octagonal or have any number of sides 290. Each side 290 may have a number of one-way flaps 300 positioned thereon. The flaps 300 may be wind driven. The wind may come from any direction. As such, the flaps 310 on the side 290 facing the wind will open while the remaining flaps 300 will remain closed so as to capture more of the wind within the multi-sided weather hood 270. Any number or size of flaps 300 may be used. Other components and other configurations may be used herein.

As above, improved capture of the wind thus should increase the initial pressure so as to improve overall gas turbine efficiency. Likewise, the use of the chimney 210 ensures that the multi-sided weather hood is above the typical local fog level 215 so as to improve the expected lifetime of the filters 250 and other components herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A turbine inlet air filter system for an incoming flow of air, comprising:
    a gas turbine engine;
    a chimney;
    a rotatable weather hood positioned on the chimney and comprising an inlet, the rotatable weather hood being configured to direct the inlet in a windward facing orientation; and
    a filter house;
    wherein the incoming flow of air flows through the rotatable weather hood, the chimney, the filter house, and into the gas turbine engine.

2. The turbine inlet air filter system of claim 1, wherein the rotatable weather hood comprises a rotation device.

3. The turbine inlet air filter system of claim 1, wherein the rotatable weather hood comprises a vertical inlet and a horizontal outlet.

4. The turbine inlet air filter system of claim 1, wherein the chimney comprises a height above a local fog level.

5. The turbine inlet air filter system of claim 1, wherein the filter house comprises a plurality of different filters therein.

6. A turbine inlet air filter system for an incoming flow of air, comprising:
    a gas turbine engine;
    a chimney;
    a multi-sided weather hood positioned on the chimney;
    a plurality of one way flaps disposed on each side of the multi-sided weather hood; and
    a filter house;
    wherein the incoming flow of air flows through the multi-sided weather hood, the chimney, the filter house, and into the gas turbine engine.

7. The turbine inlet air filter system of claim 6, wherein the multi-sided weather hood comprises a hexagonal shape.

8. The turbine inlet air filter system of claim 6, wherein the multi-sided weather hood comprises a side with open flaps and a plurality of sides with closed flaps.

9. The turbine inlet air filter system of claim 6, wherein the chimney comprises a height above a local fog level.

10. The turbine inlet air filter system of claim 6, wherein the filter house comprises a plurality of different filters therein.

* * * * *